United States Patent
Havlena et al.

(10) Patent No.: US 7,310,572 B2
(45) Date of Patent: Dec. 18, 2007

(54) PREDICTIVE CONTRACT SYSTEM AND METHOD

(75) Inventors: Vladimir Havlena, Prague (CZ); Jiri Findejs, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 167 days.

(21) Appl. No.: 11/228,922

(22) Filed: Sep. 16, 2005

(65) Prior Publication Data

US 2007/0067068 A1    Mar. 22, 2007

(51) Int. Cl.
G05D 17/00 (2006.01)
G06F 17/00 (2006.01)
G06F 19/00 (2006.01)

(52) U.S. Cl. ............... 700/291; 700/287; 700/296; 703/18; 702/60; 705/412

(58) Field of Classification Search ......... 700/286, 700/287, 291, 295–298; 703/18; 702/60–62; 705/412
See application file for complete search history.

(56) References Cited

U.S. PATENT DOCUMENTS

| 6,106,785 | A | 8/2000 | Havleena et al. |
| 6,440,374 | B1 | 8/2002 | Jelinek |
| 6,609,048 | B2 | 8/2003 | Matsuo et al. |
| 6,622,645 | B2 | 9/2003 | Havlena |
| 6,626,042 | B2 | 9/2003 | Havlena |
| 6,712,604 | B2 | 3/2004 | Havlena |
| 6,819,097 | B2 | 11/2004 | Chen |
| 2001/0025209 | A1* | 9/2001 | Fukui et al. ............... 700/291 |
| 2004/0093124 | A1* | 5/2004 | Havlena ..................... 700/291 |
| 2004/0260489 | A1 | 12/2004 | Mansingh et al. |
| 2005/0015283 | A1 | 1/2005 | Iino et al. |

FOREIGN PATENT DOCUMENTS

EP    1478074    11/2004

OTHER PUBLICATIONS

"Model-Based Predictive Control Comes to the Factory Floor", http://www.manufacturing.net/ctl.index.asp?layout=articlePrint &articleID=CA187921,( Observed Dec. 16, 2004), 7 pgs.
"Unified Energy Solutions", http://acs.honeywell.com, (2002), 4 pgs.
Brain, M., "How Power Grids Work", http://science.howstuffworks.com/power.htm/printable, (Observed Dec. 15, 2004), 16 pgs.

(Continued)

Primary Examiner—Alexander Kosowski
Assistant Examiner—Sean Shechtman
(74) Attorney, Agent, or Firm—Kris T. Fredrick

(57) ABSTRACT

A control method includes modeling a power generation apparatus, monitoring the generation of a total amount power from the power generation apparatus, monitoring internal consumption of power for a power generation apparatus, acquiring a power generation requirement for a first selected time period of a power generation apparatus to meet a power contract, and projecting an amount of total power needed over a diminishing time varying prediction horizon based on the model, the power generation requirement and the internal consumption.

21 Claims, 9 Drawing Sheets

OTHER PUBLICATIONS

Guerlain, S., et al., et al., "Visualizing Model-Based Predictive Controllers", *Proceedings of the IEA 2000/HFES 2000 Congress*, 3-511-3-514.

Kocijan, J., et al., "Gaussian Process Model Based Predictive Control", *Proceedings of the ACC 2004*, 6 pgs.

Jones, D. I., "Dynamic system parameters for the National Grid", *IEEE Proceedings: Generation, Transmission and Distribution*; 152 (1), (Jan. 10, 2005),53-60.

* cited by examiner

US 7,310,572 B2

PREDICTIVE CONTRACT SYSTEM AND METHOD

BACKGROUND

Power generation plants, owned by public utilities for producing electric power, are generally built with excess capacity. The excess capacity allows for future growth in an area. For example, if a large manufacturing site opens in the area that the power generation plant provides power to, the power generation plant would be able to provide some or all of the power required for the plant from the excess capacity. In another example, if the population of an area increased, some or all of the power required for the consumers in the area could also be provided. With public utilities, power is generated by condensing turbines with full control over the generation range.

In addition to power generation plants owned by public utilities, there are also industrial energy units that produce power. In an industrial energy unit, part of the power is generated by back-pressure/extraction turbines. This part of power generation cannot be controlled as it is defined by the process and heating steam demand for the industrial application.

The excess capacity of a power plant is placed on a power grid according to a power contract. The power generation plant will enter into a power contract with grid operator or another entity that needs power. Power contracts are for specific time slots (e.g. one hour) on a specific day. A power generation plant delivers the specified amount of electricity, in units of Megawatt hours, to a power grid. The power grid is a distribution network for moving power from a generator to a consumer of power. The power grid includes transmission substations, high voltage transmission lines, power substations, transformers, power lines, transformer drums on power poles, and other equipment.

A power generation plant with excess capacity will have a set of power contracts specifying an amount of power to deliver to the power grid for a selected hour during a week. Many power generation plants with excess capacity will have a set of power contracts for each and every hour of the week. A power plant operator operates the power plant to meet the various contracts. Ideally, the power plant operator operates the plant to just meet all of the demands (direct consumers of the power generation plant) and just meet the power contract without producing excess power or having to cycle the equipment to generate the necessary power.

If a power generation plant falls short of meeting the power contract, power can be bought on the spot market to make up the difference between the amount of power delivered to the power grid and the promised amount. Buying power on the spot market is costly.

BRIEF DESCRIPTION OF THE FIGURES

Embodiments of the present invention are illustrated by way of example and not limitation in the Figures of the accompanying drawings in which.

DETAILED DESCRIPTION

Figure 1:
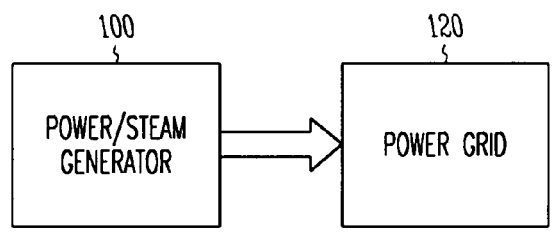
FIG. 1 is a schematic diagram illustrating a power/steam generation system attached to a power grid, according to an example embodiment.

A system and method for managing a power and steam generation system is described herein. In the following description, numerous specific details are set forth. The following description and the drawing figures illustrate aspects and embodiments of the invention sufficiently to enable those skilled in the art. Other embodiments may incorporate structural, logical, electrical, process, and other changes; e.g., functions described as software may be performed in hardware and vice versa. Examples merely typify possible variations, and are not limiting. Individual components and functions may be optional, and the sequence of operations may vary or run in parallel. Portions and features of some embodiments may be included in, substituted for, and/or added to those of others. The scope of the embodied subject matter encompasses the full ambit of the claims and substantially all available equivalents.

This system and method discusses power generation. The following terms used herein are defined as follows:

Power P [W] is defined as work divided by time.

Electric work [MWh] is electric power [MW] times time [hour].

Total power is equal to electric work.

This description of the embodiments is divided into three sections. In the first section, an embodiment of a system-level overview is presented. In the second section, methods for using example embodiments are described. In the third section, an embodiment of a hardware and operating environment is described.

System-Level Overview

This section provides a system level overview of example embodiments of the invention.

FIG. 1 is a schematic diagram illustrating a power/system steam generation system 100 attached to a power grid 120, according to an example embodiment. The power steam generator system 100 includes all the resources available to an entity to produce power or steam. For example, an entity may have a large power plant such as a coal-fired plant that generates power and steam, and an atomic power plant that produces energy and generates power and steam in another locale as well as smaller diesel fueled power plants. In other words, the power/steam generation system includes all of the various individual power plants or steam generating plants available to an entity. It should be noted that the various resources have various costs associated with the production of power or steam as it is being generated. In many instances the resources available to a particular entity for the power/steam generator system 100 will have the capability to produce more power than what is needed by the entity. For example, an entity may need a certain number of resources in order to produce power during peak times of the year. A peak time of the year can be the summer months in some geographic areas, and a peak time can also be the winter months in other more northern areas. Power or steam generation systems can be run to efficiently produce excess power which can then be placed onto the power grid 120 and sold to get additional revenue for the resource. The power steam generation system 100 is connected to the power grid 120. The power grid has all the various equipment necessary to distribute power from a power plant to individual businesses and home owners and the like. The power grid includes transmission substations, high voltage transmission lines, power substations, switching towers, distribution busses, transformers and regulator banks as well as the power poles and various power lines. In some applications, the distributions lines are underground and there are transformer boxes located near the curve at every house or two. The power steam generation system 100 may also not be able to produce enough power during certain times of the year, or during certain days and therefore the power or power/steam generation system's attachment to the power grid 120 can be used to purchase power on the spot market or under contract from other entities having over capacity. The purchased power can then be used to deliver to internal customers or used to meet internal needs such as the need for generating power, and for various customers of the entity.

Figure 2:
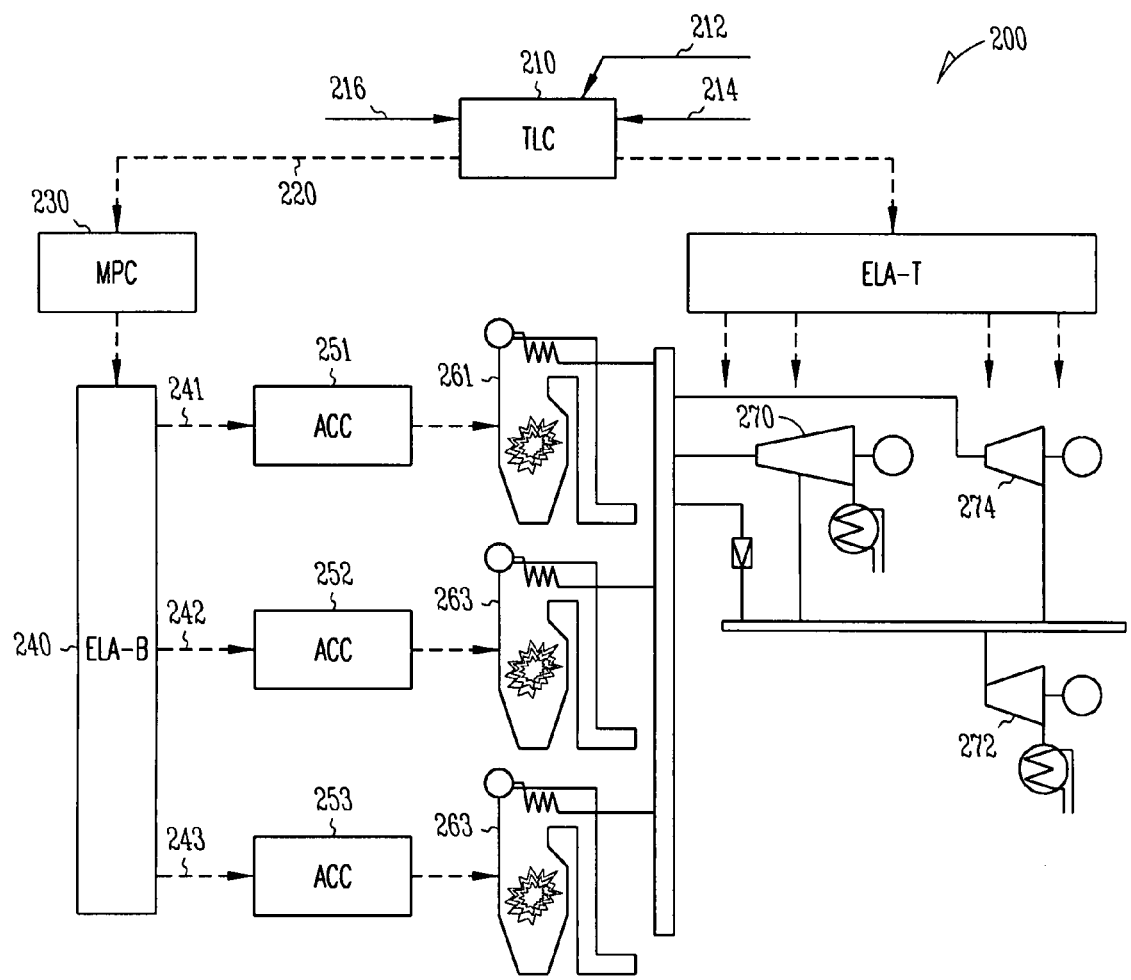
FIG. 2 is a schematic diagram of a control system for a power generation system that includes a tie-line control system for managing the connection between the power/steam generation system and the power grid, according to an example embodiment.

FIG. 2 is a schematic diagram of a control system 200 for a power generation system (such as that shown in FIG. 1) that includes a tie-line control system 210 for managing the connection between the power/steam generation system and the power grid as well as for managing parts of the control system 200, according to an example embodiment. The tie-line control system 210 receives many inputs and sends out many outputs. Among those inputs are the actual power generation 212, the actual internal consumption 214, and power contract data 216. The tie-line control system 210 outputs the prediction of the total steam consumption, as depicted by output 220. The total steam consumption is output to a master pressure control 230 which in turn sends a signal 232 to a boiler load allocation unit 240. The boiler load allocation unit sends signals 241, 242, 243 to a corresponding boiler combustion individual unit optimizer 251, 252 or 253. The boiler combustion unit optimization unit are then used to control the combustion within the boilers 261, 262, 263. The boilers 261, 262, 263 produce steam or are capable of producing steam when operating. The steam generated by one or more individual boilers 261, 262, 263 is then fed into various turbines 270, 272, 274. The turbines 270, 272, 274 can be either primary staged turbines or secondary staged turbines. The steam is used to rotate generators attached to the turbines to produce power. The tie-line control system 210 also outputs a signal to the economic allocation for turbo system 280. The ELA-T 280 receives a total power generated set point that is needed to meet contracted contract quotas for a particular measure of time or a particular selected time for generating power. Typically, a selected time for generating additional power for a contract is set up on a hourly basis. Many power/steam generation systems 100 have power contract data for every hour of every day for every week. Thus, the tie-line control system 210 monitors the actual power generated as well as the internal consumption and matches that to the power contract data 216 to determine and produce an appropriate amount of power over the selected time frame can be delivered to the power grid 120 to fulfill a power contract for the particular selected time.

The boiler combustion individual unit optimization units 251, 253, 252 are also termed advance combustion controllers. The advanced combustion controllers 251, 252, 253 are used to control the combustion process in various boilers and optimize the individual boilers for thermal efficiency as well as to stabilize emissions from the boilers to within given limits so that the combustion gases exiting the various boilers 261, 262, 263 meet emission standards for various pollution control agencies.

Figure 3:
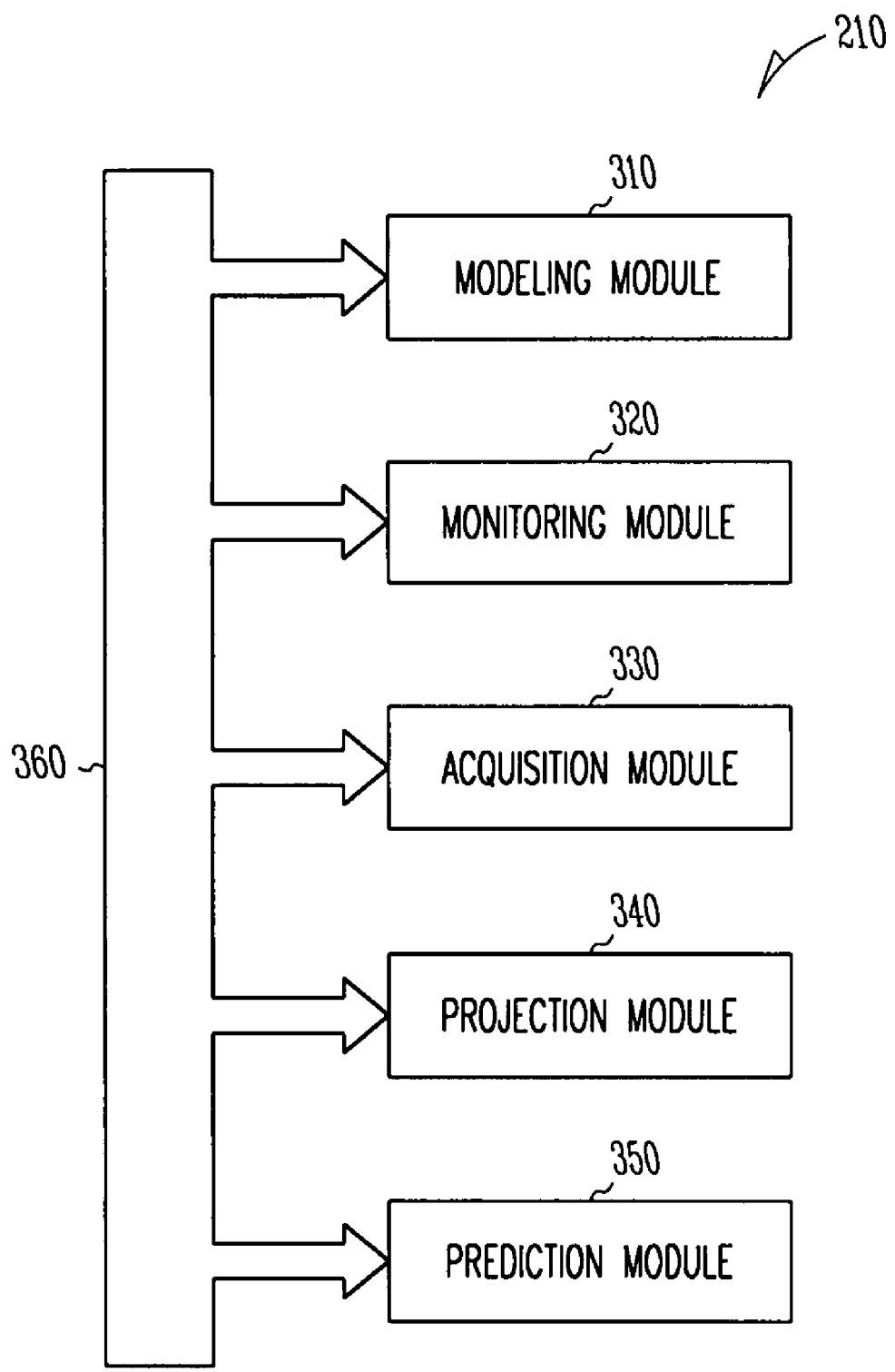
FIG. 3 is a schematic diagram of a tie-line control system for managing the connection between the power/steam generation system and the power grid, according to an example embodiment.

FIG. 3 is a schematic diagram illustrating a control system, such as a tie-line control system 210, for managing the connection between the power/steam generation system 100 and the power grid 120, according to an example embodiment. The tie-line control system 210 includes a plurality of communitively coupled modules. The tie-line control system 210 includes a modeling module 310 which is used to model a power generation apparatus in which it can also be used to model the various steam generation aspects of the power generation apparatus and, more particularly, the generation range for different equipment configurations/unit commitments. The tie-line control system also includes a monitoring module 320. The monitoring module monitors the internal consumption of power for a power generation apparatus or power steam generation system 100. The internal consumption of power includes the amount of power needed by various customers of the entity as well as the amount of power needed to generate or run the power/steam generator system 100 (shown in FIG. 1). The monitoring module 320 also monitors the generation of a total amount of power from the power/steam generation system 100. The total amount of power, in some embodiments, includes all the power that is generated over a selected time, such as a particular hour for a particular day. The tie-line control system also includes an acquisition module 330. The acquisition module acquires a power generation requirement for a selected period of time. The tie-line control system also includes a projection module. The projection module projects an amount of the total power needed based on information from the modeling module 310, the acquisition module 330, and the monitoring module 320. The tie-line system 210 also includes a prediction module 350. The prediction module 350 predicts an optimal power execution trajectory over a remaining portion of time which is needed to meet a projected amount of power. The prediction module 350 utilizes projections produced by the projection module 340. A data bus 360 is used to communitively couple each of the modules, including the modeling module 310, the monitoring module 320, the acquisition module 330, the projection module 340, and the prediction module 350. Data can be transferred amongst the module over the data bus 360 during the control process.

In operation, the modeling module 310, the monitoring module 320, the acquisition module 330, the projection module 340 and the prediction module implement a model-based predictive control over a diminishing horizon. The model-based predictive control over the diminishing horizon is used as part of the tie-line control system 210 (see FIG. 2) to control the generation of power and steam to meet internal needs. In one embodiment, an optimal power generation is predicted using a model-based predictive control engine running in administering horizon mode. In some embodiments, the tie-line control system also fulfills an external contract in addition to the internal needs of the party owning and operating the power/steam generation system 100 (see FIG. 1).

The tie-line control system 210 uses real time monitoring and prediction in execution of power contract. The prediction horizon is time varying, spanning from current time point to the end point of the contracting period, such as a selected time period of 1 hour. Along with a forward funnel of achievable generation range and optimal power execution trajectory, the tie-line control system 210 also calculates the back-propagation of the terminal constraints, such as a feasible region within which the existence of the solution of the optimization problem is guaranteed. If the predicted trajectory leaves the feasible funnel, the tie-line system 210 modifies the trajectory in the on-line, automatic contract execution model.

In an of-line decision-support mode, the tie-line control system 210 provides an early warning which enables the operators to resolve the conflict before the solution of the optimization problem becomes unfeasible.

As shown, each of the modules discussed above can be implemented in software, hardware or a combination of both hardware and software. Furthermore, each of the modules can be implemented as an instruction set on a microprocessor associated with a computer system or can be implemented as a set of instructions associated with any form of media, such as a set of instructions on a disk drive, a set of instructions on tape, a set of instructions transmitted over an Internet connection or the like.

Methods of Embodiments

This section describes methods performed by embodiments of the invention. In certain embodiments, the methods are performed by machine-readable media (e.g., software), while in other embodiments, the methods are performed by hardware or other logic (e.g., digital logic). In this section, FIGS. 4-9 will be discussed.

The tie-line control system 210 uses the modeling module 310, the monitoring module 320, the acquisition module 330, the projection module 340, and the prediction module 350 to perform a control method, such as a control method 400 or a control method 500. Control method 400 will be discussed with respect to FIG. 4. Control method 500 will be discussed with respect to FIG. 5.

Figure 4:
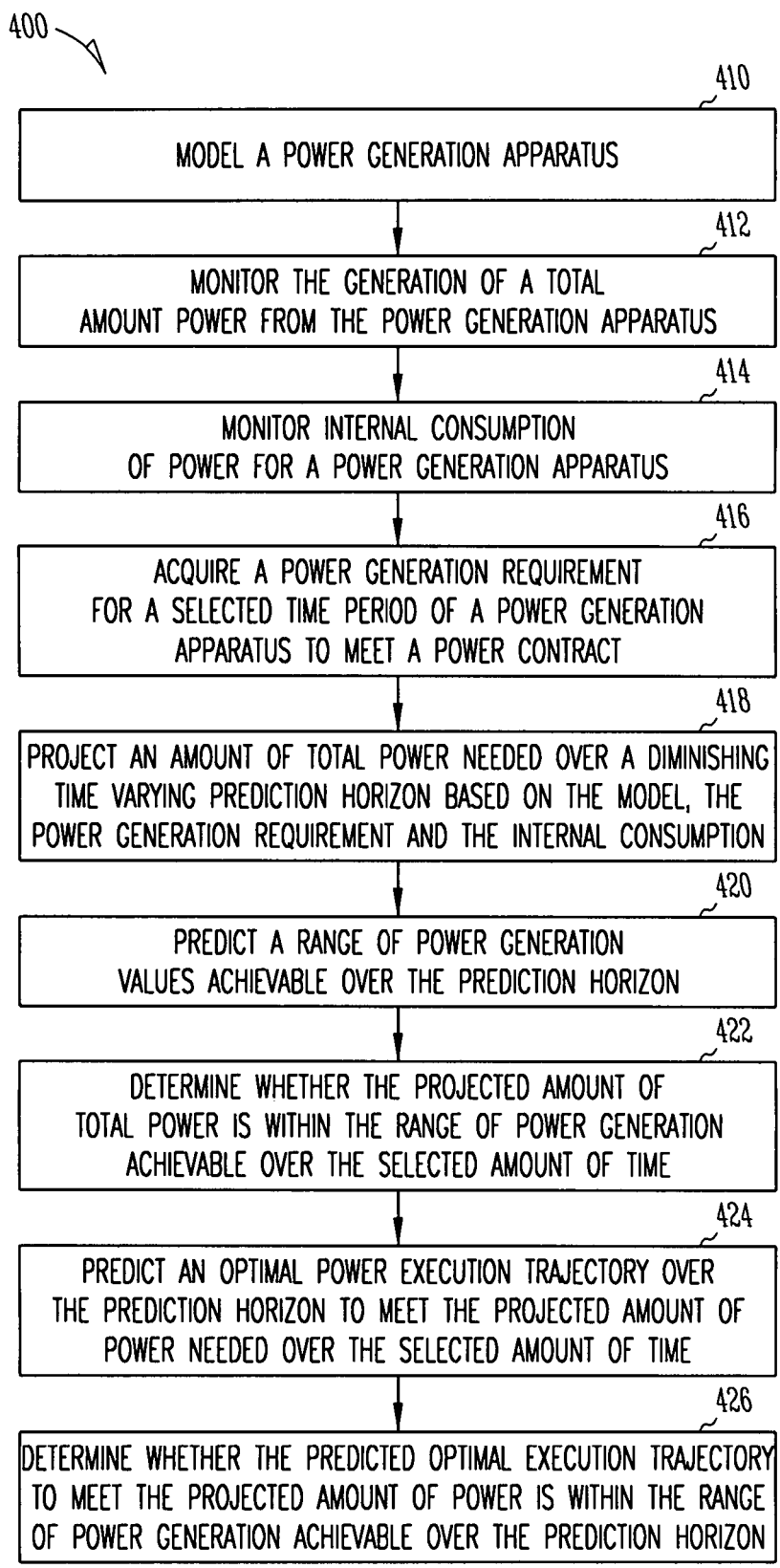
FIG. 4 is a flow chart for controlling the power/steam generation system, according to an example embodiment.

FIG. 4 are portions of a flow chart for a control method 400 for controlling the power/steam generation system, according to an example embodiment. The control method 400 includes modeling a power generation apparatus 410, monitoring the generation of a total amount power from the power generation apparatus 412 and monitoring internal consumption of power for a power generation apparatus 414. In an industrial energy unit or a system that includes an industrial energy unit, information about predicted process steam demand that affects the generation range is also included. The control method 400 also includes acquiring a power generation requirement for a selected time period of a power generation apparatus 416. The power generation requirement is needed so that the tie-line control system (shown in FIGS. 2 and 3) can determine an amount of power needed for internal use and to meet a power contract. The control method 400 projects an amount of total power needed over a diminishing time varying prediction horizon based on model of the power generation apparatus, the power generation requirement and the internal consumption 418. The control method 400 predicts a range of power generation values achievable over the prediction horizon 420, and determines whether the projected amount of total power is within the range of power generation achievable over the selected amount of time 422. If the projected amount of total power is within the range of power generation achievable over the selected amount of time, the control method 400 predicts an optimal power execution trajectory over the prediction horizon to meet the projected amount of power needed over the selected amount of time 424. In one embodiment, predicting the optimal execution trajectory is done by calculating an optimal execution trajectory. The optimal power contract execution trajectory determines the least costly use of the various resources available within a particular entity for the production of the required amount of power over the prediction horizon. Over the selected time associated with the prediction horizon, the control method 400 also includes periodically or continuously determining whether the predicted optimal power execution trajectory will meet the projected amount of power within the range of power generation achievable over the prediction horizon 426. Predicting a range of power generation achievable over the prediction horizon includes predicting a range that includes at least one disturbance variable, such as heating steam demand, process steam demand, home consumption or needs from various ancillary services.

Figure 5:
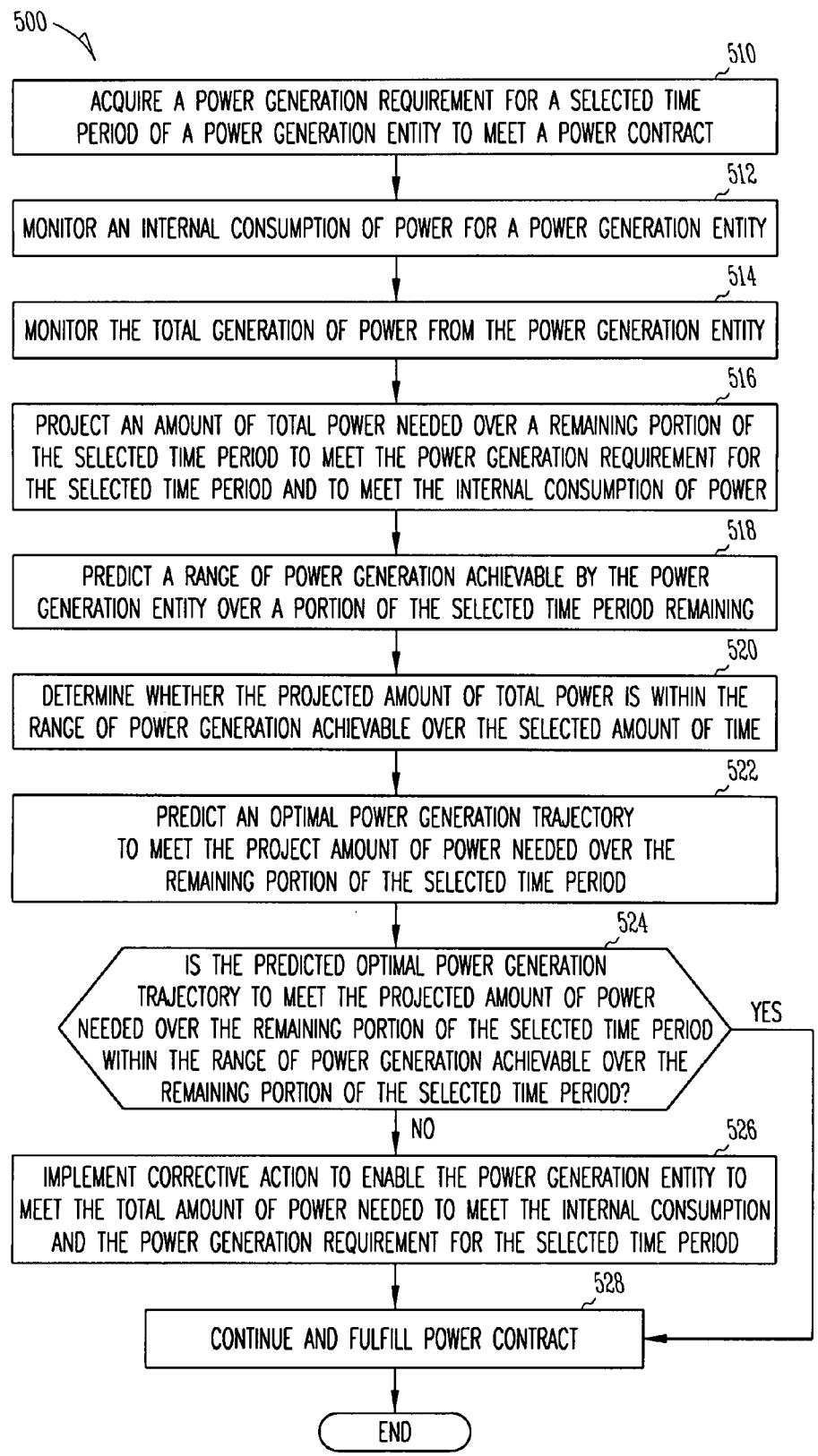
FIG. 5 is a flow chart for controlling the power/steam generation system, according to another example embodiment.

FIG. 5 is a flow chart for a method 500 for controlling the power/steam generation system, according to another example embodiment. The control method 500 includes acquiring a power generation requirement for a selected time period of a power generation entity to meet a power contract 510, monitoring both an internal consumption of power for a power generation entity 512, and the total generation of power from the power generation entity 514. The control method 500 also includes projecting an amount of total power needed over a remaining portion of the selected time period to meet the power generation requirement for the selected time period and to meet the internal consumption of power 516. In some example embodiments, the projected amount of total power needed includes an amount of total power produced over a past portion of the selected time period. The total power includes at least two components. The total power includes an internal power consumption plus a power supply requirement. The power generation requirement relates to an amount of power needed to fulfill a power contract. The internal power consumption over a selected time includes an amount of power for delivery to internal customers, and an amount of power for operating the power generation entity. The control method 500 also includes predicting a range of power generation achievable by the power generation entity over a portion of the selected time period remaining 518, and determining whether the projected amount of total power is within the range of power generation achievable over the selected amount of time 520.

The control method 500 also includes predicting an optimal power generation trajectory to meet the projected amount of power needed over the remaining portion of the selected time period 522. In one embodiment, predicting the optimal execution trajectory is done by calculating an optimal execution trajectory. The power generation trajectory may also be termed the power contract execution trajectory.

Predicting a range of power generation achievable over the remaining portion the selected time period includes predicting a range that includes at least one disturbance variable. The control method 500 also includes a decision related to whether the predicted optimal power generation trajectory to meet the projected amount of power needed over the remaining portion of the selected time period is within the range of power generation achievable over the remaining portion of the selected time period 524. This decision is shown in question form within a decision box in FIG. 5B. If the predicted optimal power generation will not meet the projected amount of power needed, the power contract is fulfilled 528. The control method further includes predicting an optimal power generation trajectory to meet the projected amount of power needed over the selected time period 526 and the power contract is fulfilled 528. If the predicted optimal power generation will meet the projected amount of power needed, the power contract is fulfilled 528.

Within the selected time period, monitoring internal consumption of power 512 for a power generation entity, monitoring the generation of actual power 514 from the power generation entity, projecting an amount of total power needed 516 over the selected time period based on the power generation requirement and the internal consumption, and determining whether the projected amount of total power is within the range of power generation achievable 518 is done a plurality of times. In some embodiments, the monitoring and projections are done substantially continuously over the selected time period.

The control method 500 also includes generating a warning when the projected amount of total power is outside of the range of power generation achievable over the first selected amount of time. The warning tells an operator that corrective action such as buying power or utilizing additional resources will or may be needed. In another embodiment, the control method 500 also includes implementing corrective action to enable the power generation entity to meet the total amount of power needed to meet the internal consumption and the power generation requirement for the first selected time period. Corrective actions include purchasing power from a power grid to meet the power generation requirement, generating power from an additional power entity to meet the power generation requirement, or selling excess power to a power grid. The control method 500 may also include modifying a trajectory to meet total power needed when the projected amount of total power is outside of the range of power generation achievable over the selected amount of time.

Figure 6:
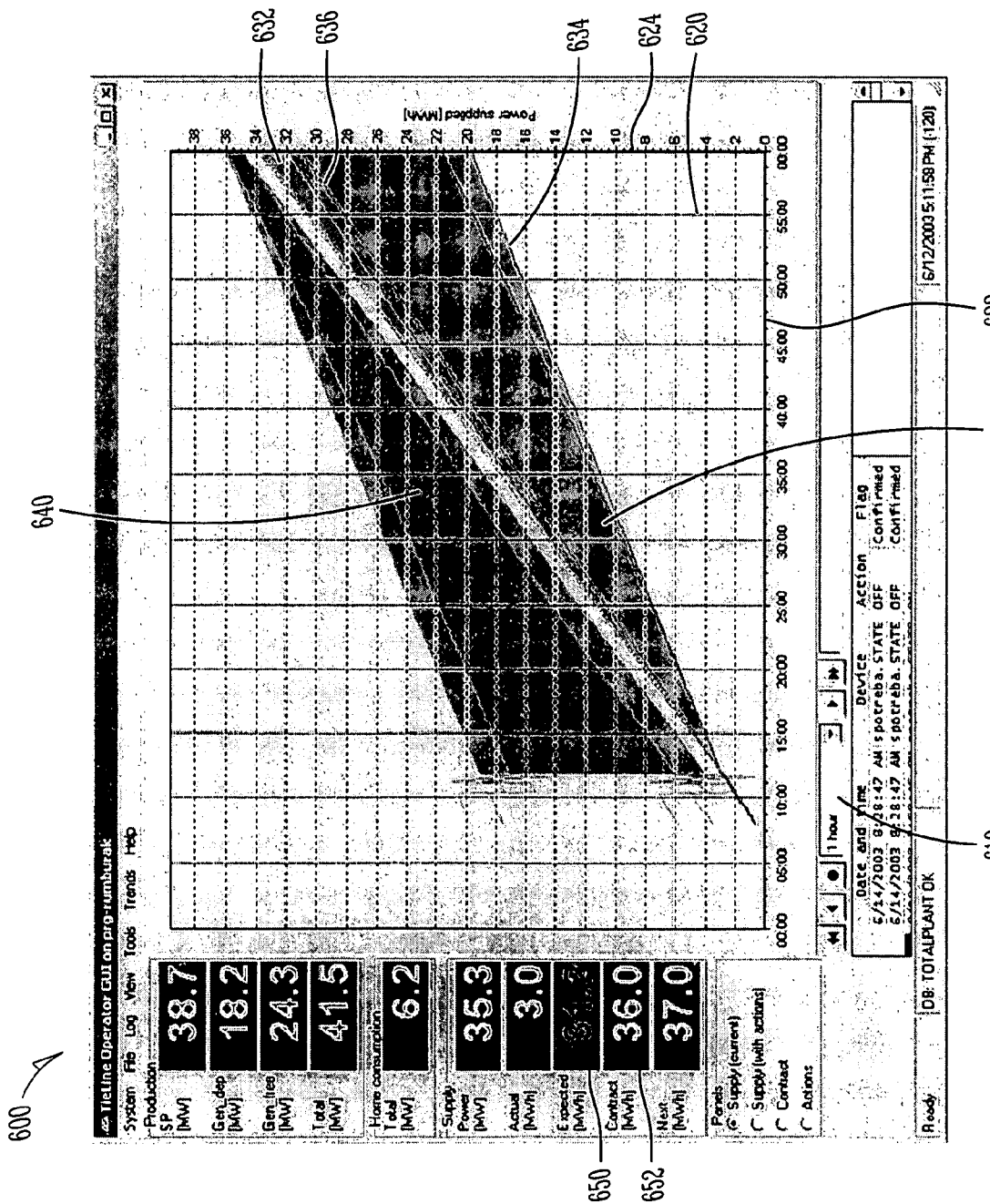
FIG. 6 is a screen shot associated with the control function at a time near the beginning of a selected time period where the maximum amount of power capable of being supplied by a power generation system is less than the amount of power needed, according to an example embodiment.

FIG. 6 is a screen shot 600 associated with the tie-line control system 210 (see FIG. 2) at a time near the beginning of a selected time period 610 where the maximum amount of power capable of being supplied by a power generation system is less than the amount of power needed, according to an example embodiment. The screen shot 600 includes a setting for a selected time period 610. The screen shot 600 also includes a graph of the time period 610 versus the electrical work supplied in megawatt hours. The graph 620 has the time period set forth in minutes on the X axis 622, and has the total power (electric work) supplied in units of megawatt hours (MWh). The screen shot also includes a forward funnel 630 of an achievable generation range. The forward funnel has the maximum amount of power which can be supplied over the remaining portion of the selected time period as a top line 632 of the forward funnel 630. The forward funnel of achievable supply range 630 has a lower line 634 which depicts the minimum amount of power that can be supplied over the remaining portion of the time frame 610. As shown in FIG. 6, approximately 12 minutes of the 1 hour has elapsed and the forward looking funnel 630 of achievable power spans over the remaining 48 minutes of the time period 610. The forward funnel of achievable generation 630 also includes an optimal power execution or generation trajectory depicted by the line 636. The optimal power contract execution or generation trajectory 636 includes producing power at the least possible cost for the given resources of the power/steam generation system 100. It should be noted that in some embodiments, the forward funnel of achievable generation range includes only a portion of the resources that are currently operating of the power/steam generation system 100. In another embodiment, the forward funnel of achievable generation 630 may be for all resources available to a particular power/steam generation system 100. Also included on the graph 620 is an area of back-propagation of various terminal restraints 640. The back-propagation of terminal constraints can include a feasible region within which the existence of a solution for a particular problem, such as providing an adequate amount of power for both internal needs as well as an external contract, is guaranteed. The back-propagation of terminal constraints 640 also has an upper and lower portion and includes a prediction of areas of uncertainty such as variances in heating steam demand, variances in process steam demand, internal consumption for home users, as well as consumption for ancillary services. Basically, the back-propagation of terminal constraints is an area which includes a prediction of uncertainty based on a short term prediction over the remaining portion of the selected time period 610. As shown in FIG. 6, the forward funnel of achievable generation 630 does not lie within the area associated with the back-propagation of terminal constraints 640. Of course in some embodiments, to calculate the forward and backward funnels, utilization of predicted process steam demand and internal consumption are used. This signals an unfeasible target for generation of power. In other words, even at maximum generation over the remaining portion of the time period 610, a sufficient amount of power cannot be generated to meet both the internal demands as well as the external contract. When the target supply is determined as unfeasible, an early warning indicating that action is needed by an operator is signaled. As shown in FIG. 6, an amount for expected megawatt hours, depicted by reference numeral 650, is less than an amount necessary to supply a contract, as depicted by reference numeral 652. An early warning is produced by turning the entry for the expected megawatt hours to be produced over the time period, as depicted by reference numeral 650, a different color. In other embodiments, the entry 650 can flash and audible alarms may be sounded or signals may be sent to other operators to assure that an operator action, if needed, will be taken.

Figure 7:
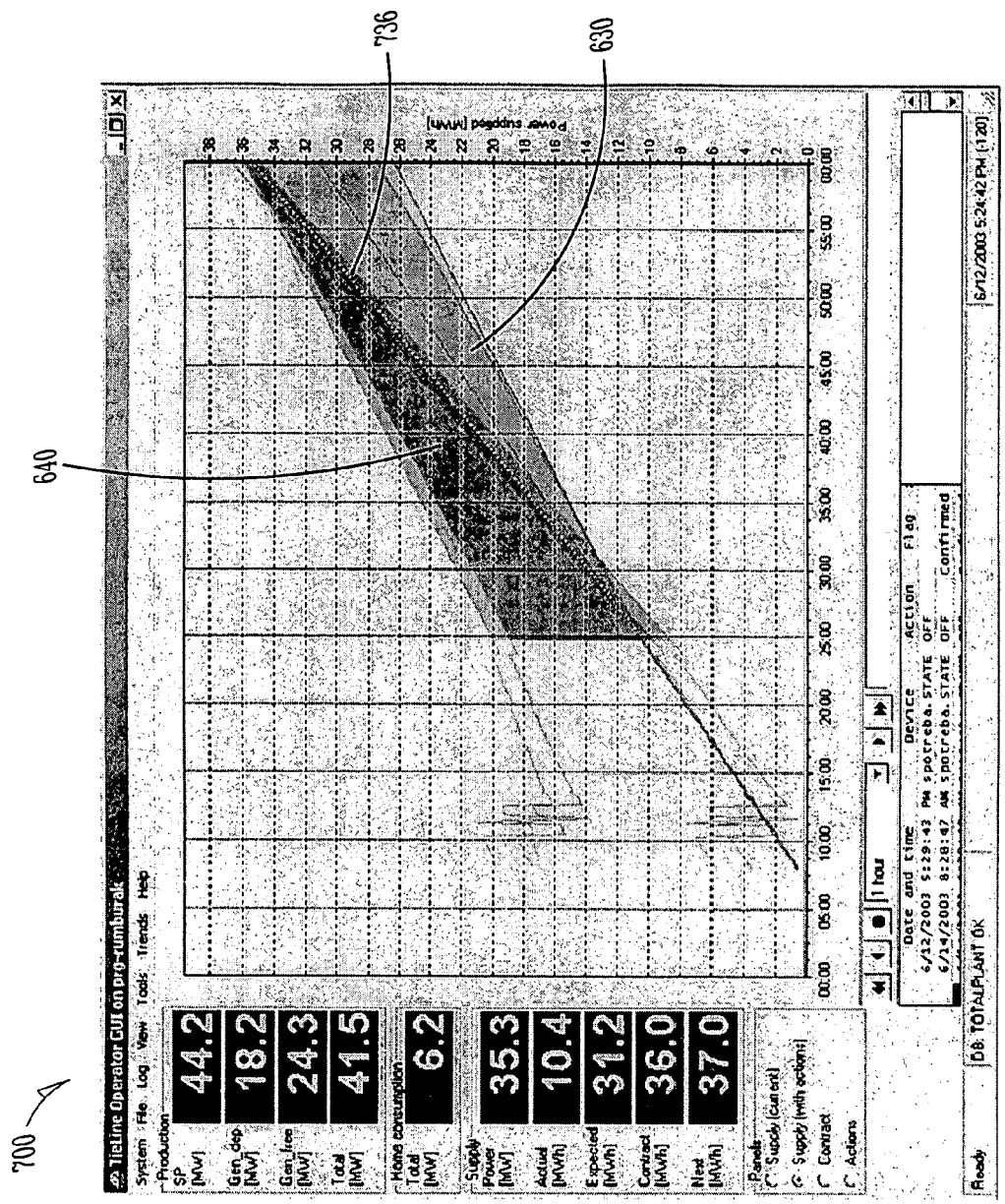
FIG. 7 is a screen shot associated with the control function after corrective action has been taken, according to an example embodiment.

The operator action includes a plan to increase the generation range of the power/steam generation system 100. This can include adding extra resources to the resources already operating within the power/steam generation system 100. Another operator action may be to purchase power on the spot market to cover the amount of power needed to be generated to cover the contract as well as the amount of internal usage. The effect of such operator action is to move the forward funnel of generation achievable 630 or shift the funnel of achievable power generation 630 upwards so that it intersects with the back-propagation of terminal constraints 640, as shown in FIG. 7. When the forward funnel of power generation 630 intersects with the area associated with the back-propagation of terminal constraints 640, the power generation needs of both internal customers and external contract can then be met. A trajectory for power generation over the remaining portion of the time frame necessary to achieve the amount of power needed is depicted by line 736. When the forward funnel of achievable generation range 630 is within the back-propagation of terminal constraints area 640, the risk of not meeting the contract and not meeting the power generation needs is minimized while reducing the amount of uncertainty.

Figure 8:
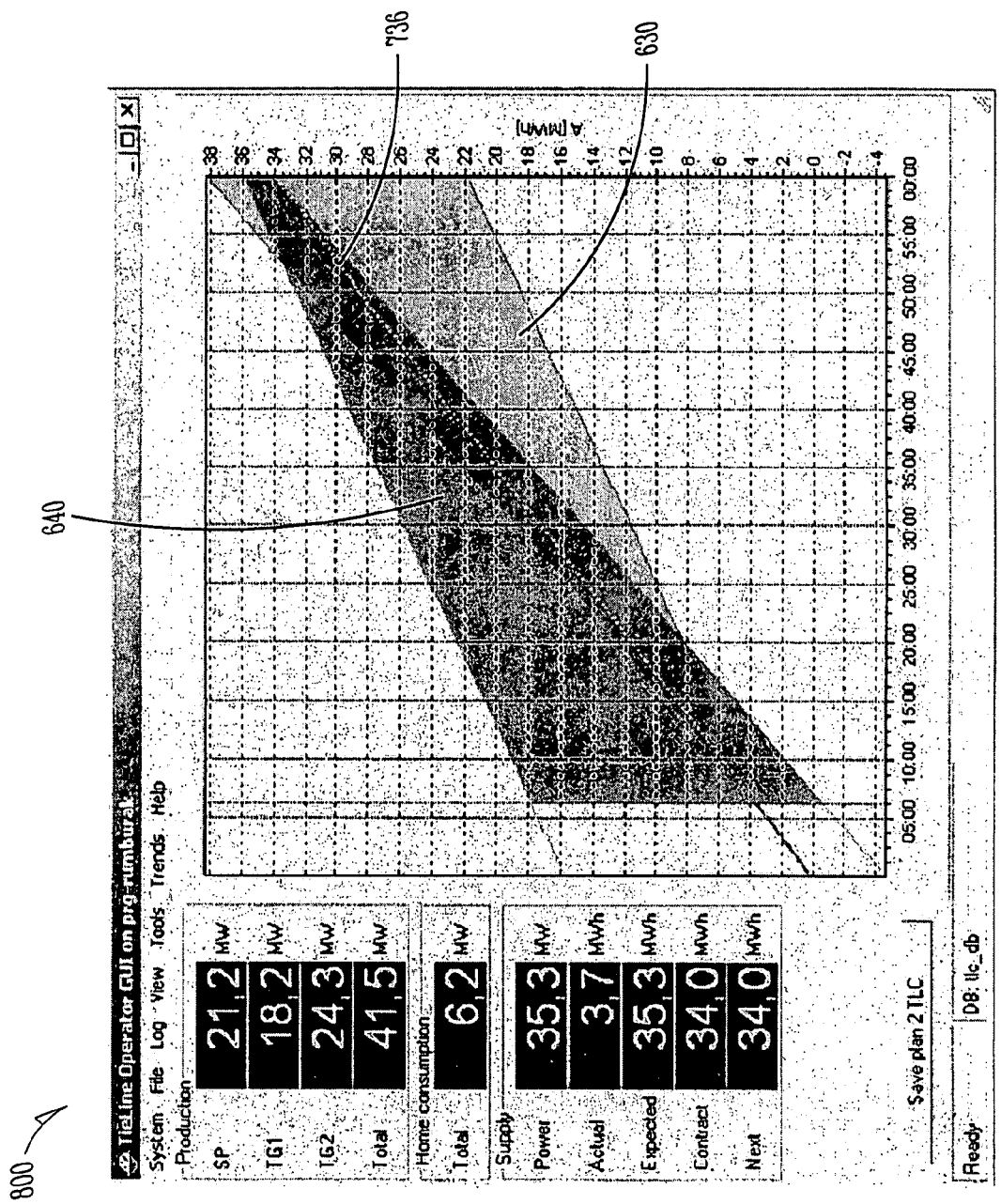
FIG. 8 is a screen shot associated with the control function at a time near the beginning of a selected time period, according to an example embodiment.

FIG. 8 is a screen shot 800 associated with a control function of a tie-line control system 210, a time near a beginning of a selected time period 610, according to an example embodiment of the invention. In this particular example embodiment, the graph 610 includes a forward funnel of achievable generation 630 which intersects with the area associated with the back-propagation of terminal constraints 640. The area of intersection between the forward funnel 630 and the back-propagation of constraint 640 is more sizable than the common area as shown in FIG. 7. The area of intersection also includes a optimal power generation trajectory that can be followed to achieve the generation of an adequate amount of power to provide for internal needs, as well as an external contract. The optimization trajectory carries the reference number 736. As shown in FIG. 8, the calculation of the forward feasible funnel 630, as well as the back-propagation of terminal restraints 640 is done at approximately six minutes within the selected time frame of one hour.

Figure 9:
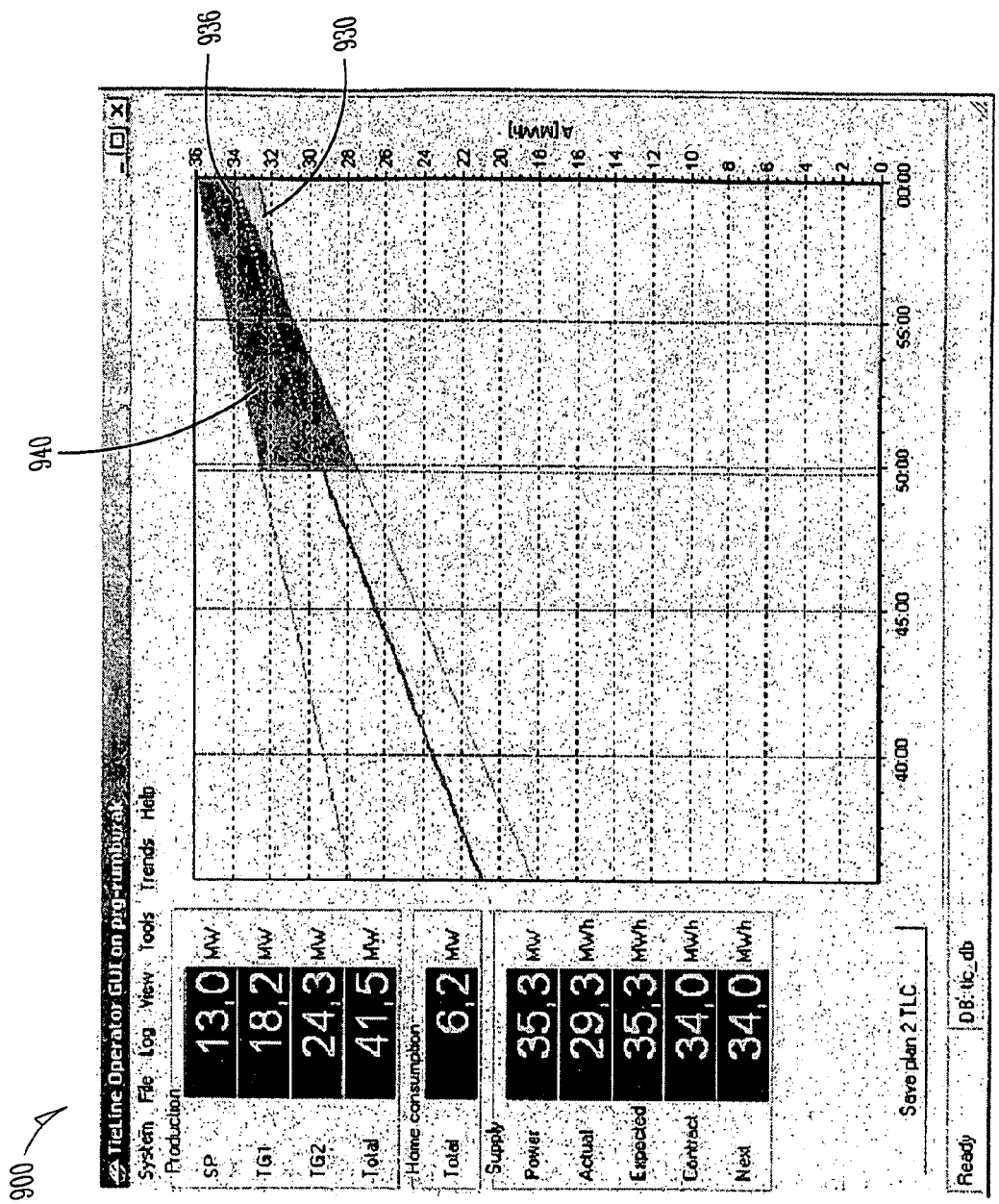
FIG. 9 is a screen shot associated with the control function at a time near the end of a selected time period, according to an example embodiment.

FIG. 9 is a screen shot 900 associated with the tie-line control function at a time near the end of a selected time 610, according to an example embodiment. The forward funnel of generation is recalculated and graphed for the remaining ten minutes of the selected time period of one hour 610. Also recalculated is the back-propagation of the terminal constraints 940. Also recalculated is the power generation trajectory 936. The point of this particular screen shot 900 and the screen shot 800 is that the forward funnel of achievable generation range, such as 930 and the area associated with the back-propagation of the terminal constraints depicted by the area 940 is periodically recalculated. In some embodiments of the invention, the forward funnel of achievable generation range 930 and the area associated with the back-propagation of terminal constraints 940 as well as the optimal power execution trajectory 936 are recalculated at selected time intervals. In other embodiments, these recalculations are made substantially continuously over the time frame or selected time period. Thus, the power/steam generation system 100 is continuously or substantially continuously or periodically monitored and the prediction module and projection modules are then used to produce the area associated with the back-propagation of terminal constraints 940 substantially continuously or periodically as well.

Figure 10:
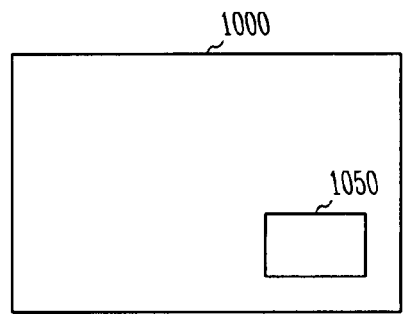
FIG. 10 is a schematic diagram illustrating a media having an instruction set, according to an example embodiment.

FIG. 10 is a schematic diagram illustrating of a media 1000 that includes an instruction set 1050, according to an example embodiment. The machine readable medium 1000 includes any type of medium such as a link to the internet or other network, or a disk drive or a solid state memory device, or the like. A machine-readable medium 1000 includes instructions within the instruction set 1050. The instructions, when executed by a machine such as an information handling system or a processor, cause the machine to perform operations that include the control methods, such as the ones discussed in FIGS. 4-9. For example, a machine-readable medium 1000 that includes a set of instructions 1050, the instructions, when executed by a machine, cause the machine to perform operations including modeling a power generation apparatus 410, monitoring the generation of a total amount power from the power generation apparatus 412, monitoring internal consumption of power for a power generation apparatus 414, acquiring a power generation requirement 416 for a first selected time period of a power generation apparatus to meet a power contract, and projecting an amount of total power needed over a diminishing time varying prediction horizon based on the model, the power generation requirement and the internal consumption 418. The instructions also cause the machine to perform operations including predicting a range of power generation values achievable 420 over the diminishing time varying prediction horizon, and determining whether the projected amount of total power is within the range of power generation achievable over the first selected amount of time 422. In some embodiments, the instructions also cause the machine to predict an optimal power execution trajectory over the prediction horizon to meet the projected amount of power needed over the first selected amount of time 424. In some embodiments, the instructions also cause the machine to determine whether the predicted optimal power execution trajectory to meet the projected amount of power is within the range of power generation achievable over the prediction horizon 426 (see FIG. 4).

Hardware and Operating Environment

This section provides an overview of the example hardware and the operating environment in which embodiments of the invention can be practiced.

Figure 11:
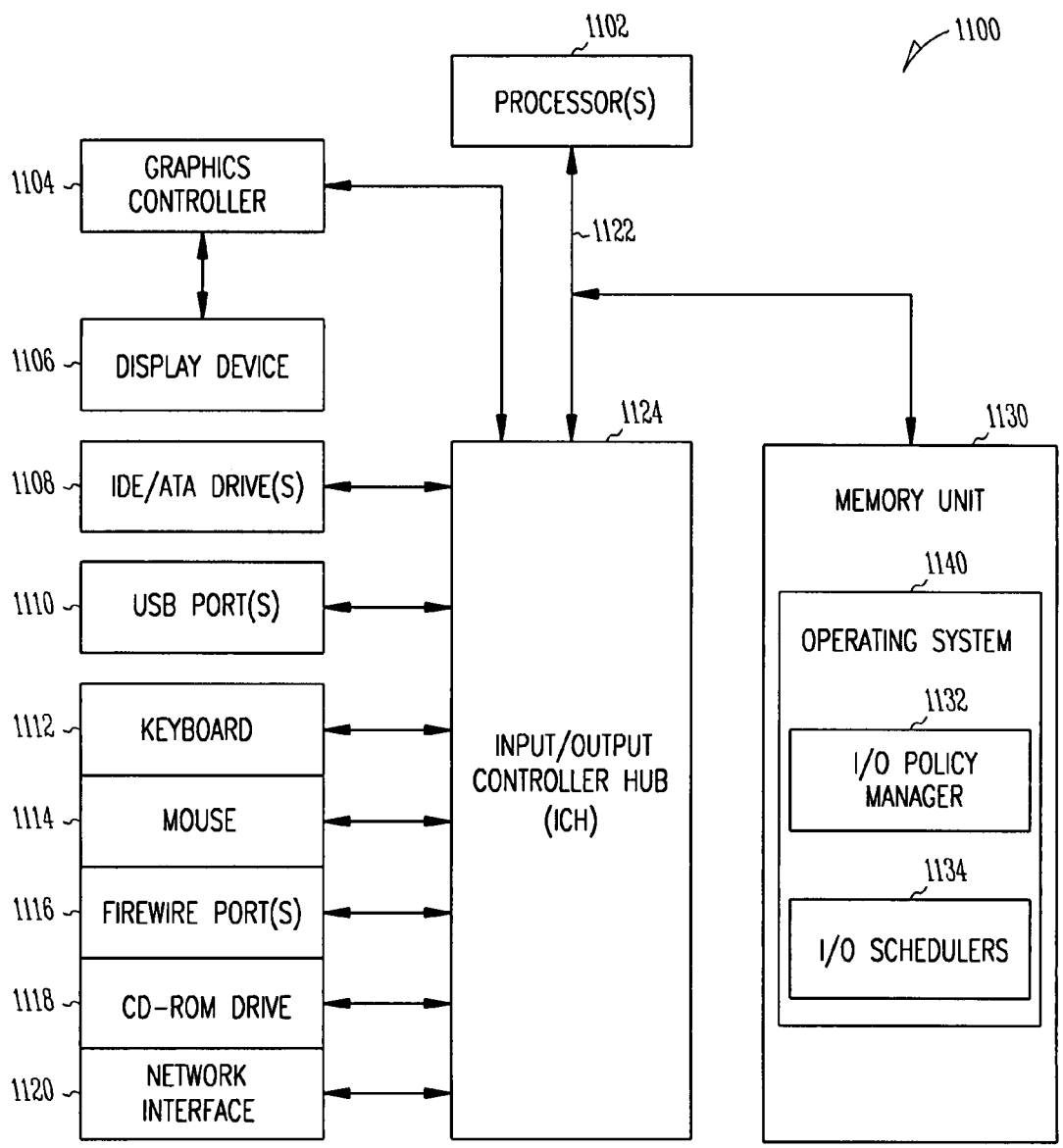
FIG. 11 illustrates an example computer system used in conjunction with certain example embodiments.

FIG. 11 illustrates an example computer system used in conjunction with certain embodiments of the invention. As illustrated in FIG. 10, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read-only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. The ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system, method, and machine-readable medium including instructions for Input/Output scheduling have been described. Although the present invention has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

The invention claimed is:

1. A control method comprising:
   acquiring a power generation requirement for a selected time period of a power generation entity to meet a power contract;
   monitoring an internal power consumption of power for a power generation entity;
   monitoring the total generation of power from the power generation entity;
   projecting an amount of total power needed over a remaining portion of the selected time period to meet the power generation requirement for the selected time period and to meet the internal power consumption, the projected amount of total power needed over a selected time period including an amount of total power produced over a past portion of the selected time period;
   predicting a range of power generation achievable by the power generation entity over a portion of the selected time period remaining; and
   determining whether the projected amount of total power is within the range of power generation achievable over the selected time period.

2. The method of claim 1 wherein the internal power consumption over a selected time period includes an amount of power for delivery to customers, and an amount of power for operating the power generation entity.

3. The method of claim 1 further comprising predicting an optimal power generation trajectory to meet the projected amount of total power needed over the remaining portion of the selected time period.

4. The method of claim 3 wherein predicting an optimal power generation includes using a model-based predictive control engine running in administering horizon mode.

5. The method of claim 3 further comprising determining whether the predicted optimal power generation trajectory to meet the projected amount of power needed over the remaining portion of the selected time period is within the range of power generation achievable over the remaining portion of the selected time period.

6. The method of claim 1 wherein predicting a range of power generation achievable over the portion of the selected time period remaining includes predicting a range that includes at least one disturbance variable.

7. The method of claim 1 wherein projecting an amount of total power needed over the selected time period includes an amount of power actually generated during the portion of the selected amount of time that has passed.

8. The method of claim 1 wherein monitoring internal power consumption for a power generation entity, monitoring the total generation of power from the power generation entity, projecting an amount of total power needed over the selected time period based on the power generation requirement and the internal consumption, and determining whether the projected amount of total power is within the range of power generation achievable over the selected time period is done a plurality of times within the selected time period.

9. The method of claim 1 wherein monitoring internal power consumption for a power generation entity, monitoring the total generation of power from the power generation entity, projecting an amount of total power needed over the selected time period based on the power generation requirement and the internal consumption, and determining whether the projected amount of total power is within the range of power generation achievable over the selected time period is done substantially continuously.

10. The method of claim 1 further comprising generating a warning when the projected amount of total power is outside of the range of power generation achievable over a first selected amount of time.

11. The method of claim 10 further comprising implementing corrective action to enable the power generation entity to meet the total amount of power needed to meet the internal consumption and the power generation requirement for the first selected time period.

12. The method of claim 11 wherein implementing corrective action includes generating power from an additional power entity to meet the power generation requirement.

13. The method of claim 11 wherein implementing corrective action includes selling excess power to a power grid.

14. The method of claim 1 further comprising modifying a trajectory to meet total power needed when the projected amount of total power is outside of the range of power generation achievable over the first selected amount of time.

15. A control method comprising:
    modeling a power generation apparatus;
    monitoring a generation of a total amount power from the power generation apparatus;
    monitoring internal consumption of power for a power generation apparatus;
    acquiring a power generation requirement for a first selected time period of a power generation apparatus to meet a power contract;
    projecting an amount of total power needed over a diminishing time varying prediction horizon based on the model, the power generation requirement and the internal consumption;
    predicting a range of power generation values achievable over the prediction horizon; and
    determining whether the projected amount of total power is within the range of power generation achievable over the prediction horizon.

16. The method of claim 15 further comprising predicting an optimal power execution trajectory over the prediction horizon to meet the projected amount of power needed over the prediction horizon.

17. The method of claim 16 further comprising determining whether the predicted optimal power execution trajectory to meet the projected amount of power is within the range of power generation achievable over the prediction horizon.

18. The method of claim 15 wherein predicting a range of power generation achievable over the prediction horizon includes predicting a range that includes at least one disturbance variable.

19. A tangible machine-readable medium that includes a set of instructions, the instructions, when executed by a machine, cause the machine to perform operations comprising:
modeling a power generation apparatus;
monitoring a generation of a total amount power from the power generation apparatus;
monitoring internal consumption of power for a power generation apparatus;
acquiring a power generation requirement for a first selected time period of a power generation apparatus to meet a power contract;
projecting an amount of total power needed over a diminishing time varying prediction horizon based on the model, the power generation requirement and the internal consumption;
predicting a range of power generation values achievable over the diminishing time varying prediction horizon; and
determining whether the projected amount of total power is within the range of power generation achievable over the prediction horizon.

20. The tangible machine readable medium of claim 19 wherein the instructions that cause a machine to perform operations when executed by the machine further comprise determining whether a predicted optimal power execution trajectory to meet the projected amount of power is within the range of power generation achievable over the prediction horizon.

21. The tangible machine readable instruction of claim 19 wherein predicting a range of power generation achievable over the prediction horizon includes predicting a range that includes at least one disturbance variable.

* * * * *